(12) United States Patent
Brock

(10) Patent No.: US 7,096,726 B2
(45) Date of Patent: Aug. 29, 2006

(54) FUEL INJECTOR SYSTEM DIAGNOSTIC SYSTEM

(75) Inventor: John L. Brock, Auburn, MI (US)

(73) Assignee: SenX Technology, LLC, Midland, MI (US)

(*) Notice: Subject to any disclaimer, the term of this patent is extended or adjusted under 35 U.S.C. 154(b) by 0 days.

(21) Appl. No.: 11/289,973

(22) Filed: Nov. 30, 2005

(65) Prior Publication Data

US 2006/0101904 A1 May 18, 2006

Related U.S. Application Data

(62) Division of application No. 10/958,769, filed on Oct. 5, 2004.

(60) Provisional application No. 60/514,305, filed on Oct. 24, 2003.

(51) Int. Cl.
*G01M 15/00* (2006.01)

(52) U.S. Cl. .................................................. 73/119 A

(58) Field of Classification Search .................. 73/116, 73/117.2, 117.3, 118.1, 119 A, 119 R; 340/438, 340/439, 451; 701/101, 103, 104
See application file for complete search history.

(56) References Cited

U.S. PATENT DOCUMENTS

| | | | | |
|---|---|---|---|---|
| 5,698,777 A | * | 12/1997 | Ramseyer et al. | ............. 73/116 |
| 5,715,780 A | * | 2/1998 | Haller | ...................... 123/90.17 |
| 5,987,973 A | * | 11/1999 | Fujii et al. | ..................... 73/116 |
| 6,035,707 A | * | 3/2000 | Main | ............................ 73/116 |
| 6,324,902 B1 | * | 12/2001 | Kang | ........................... 73/116 |
| 6,481,270 B1 | * | 11/2002 | Kobayashi et al. | ............ 73/116 |
| 6,484,589 B1 | | 11/2002 | Brock | |
| 6,609,416 B1 | | 8/2003 | Brock | |
| 6,655,187 B1 | * | 12/2003 | Lehner et al. | ................ 73/1.75 |
| 6,727,689 B1 | * | 4/2004 | Furlong et al. | ......... 324/207.25 |
| 2003/0000498 A1 | * | 1/2003 | Mathews et al. | ....... 123/406.62 |
| 2003/0216853 A1 | * | 11/2003 | Jacobson | ..................... 701/106 |

* cited by examiner

*Primary Examiner*—Eric S. McCall
(74) *Attorney, Agent, or Firm*—Robert L. McKellar; McKellar IP Law, PLLC

(57) ABSTRACT

An internal combustion engine diagnostic sensor system comprises a fuel rail for the engine wherein the fuel rail has a high pressure inlet end, a plurality of injector ports, and a terminating end and wherein a piezoelectric sensor is mounted on the terminating end. The piezoelectric sensor is in open communication with contents in the fuel rail. In addition, the internal combustion engine diagnostic sensor system comprises a fuel rail for the engine wherein the fuel rail has a high pressure inlet end, a plurality of injector ports and a terminating end. There is also a connector disposed at the high pressure inlet end of the fuel rail wherein the connector has a near end that is openly connected to the fuel rail, and a distal end that has mounted thereon, a valve. There is surmounted on the valve, a piezoelectric sensor, wherein the piezoelectric sensor is in open communication with the contents of the fuel rail through the valve.

2 Claims, 4 Drawing Sheets

FUEL INJECTOR SYSTEM DIAGNOSTIC SYSTEM

This application claims priority from U.S. Provisional Patent application U.S. Ser. No. 60/514,305, filed on Oct. 24, 2003, and U.S. Utility Patent application U.S. Ser. No. 10/958,769, filed on Oct. 5, 2004.

The invention disclosed and claimed herein deals with diagnostic systems for internal combustion engines, in which the diagnostic device is provided on the fuel injection system of the engine.

BACKGROUND OF THE INVENTION

Automotive diagnostic devices are well known in the art and are based on vacuum sensors and ignition sensors and are usually comprised of large pieces of equipment, such as, for example, a Snap-on, Sun Machine, automotive engine analyzer. More recently, there has evolved a new diagnostic sensor that is used to diagnose engine ailments that is an insertable component having means by which the device is connected to the exhaust pipe of the engine and the device signals the operation of the engine while it is running. Such devices are disclosed, for example, in U.S. Pat. No. 6,484,589, that issued on Nov. 26, 2002 to John L. Brock and U.S. Pat. No. 6,609,416 that issued to Brock on Aug. 26, 2003, both of which are incorporated herein by reference for what they teach about the construction, components, and materials of the sensors disclosed therein.

THE INVENTION

What is disclosed and claimed herein in one embodiment is an internal combustion engine diagnostic sensor system comprising in combination a fuel rail for the engine wherein the fuel rail has a high pressure inlet end, a plurality of injector ports, and a terminating end and wherein a piezoelectric sensor is mounted on the terminating end thereof, the piezoelectric sensor being in open communication with the fuel rail.

Another embodiment of this invention is an internal combustion engine diagnostic sensor system comprising in combination a fuel rail for said engine wherein the fuel rail has a high pressure inlet end, a plurality of injector ports and a terminating end. There is also a connecting means disposed at the high pressure inlet end of the fuel rail wherein the connecting means has a near end that is openly connected to the fuel rail, and a distal end that has mounted thereon, a valve. There is surmounted on the valve, a piezoelectric sensor, wherein the piezoelectric sensor is in open communication with the fuel rail through the valve.

Yet a third embodiment is a method of diagnosing internal combustion engine disorders, the method comprising providing an internal combustion engine having an diagnostic sensor system as disclosed herein, providing a means for evaluation of the output from the diagnostic sensor system, and, using the internal combustion engine diagnostic system while the internal combustion engine is operating.

Still another embodiment is a vehicle wherein the vehicle has installed therein, a system of this invention, the system being electronically connected to any computer or other electronics located within the vehicle and which are electronically compatible therewith.

A further embodiment is a method of warning of an internal combustion engine disorder, the method comprising installing on or near an internal combustion engine an internal combustion engine diagnostic system as disclosed herein wherein the system is electronically connected to a computer or other electronics and electronically compatible therewith and also providing a visible warning apparatus that is triggered by the computer or other electronics when there is an engine disorder indicated by the internal combustion engine diagnostic system. Thus, for purposes of this invention, the word "diagnostic" also includes use as a monitor or as an input device for a control application.

With more specificity, in each embodiment set forth above, there is disclosed and claimed herein an internal combustion engine diagnostic sensor system that has mounted on it a diagnostic sensor as disclosed in the above-mentioned U.S. patents, among other sensors, wherein the diagnostic sensor is mounted such that it is in open communication with the fuel rail, which means, that the sensor is in direct communication with the fuel in the fuel rail. With even more specificity, and with regard to the sensor per se, there is provided a sensor device comprising an insertable component having a housing that has a front and a back. The back has centered in it a closed hub that has a wall. The closed hub is integrally connected to and surmounted on an annular flange wherein the flange is integrally connected to and surmounted on an open hub. The open hub has a wall defining an interior void space, a front, an external surface, a shouldered seat in the wall at the open hub front thereof, and a bottom in the interior void space. The open hub has threads on the external surface and has an opening from the bottom of the void space and through a portion of the closed hub to form an elongated cavity on the interior of the closed hub. The closed hub has at least two second openings leading from the cavity through the closed hub wall and exiting to the outside of the closed hub, there being located in each such second opening, an electrical lead, each electrical lead having an external end and an internal end. The external end terminates upon exiting the closed hub through one of the second openings. The internal end passes into the elongated cavity and connects electrically to a wire lead wherein each wire lead passes through the elongated cavity, through the void space, and connects electrically to a piezoelectric diaphragm, which diaphragm is seated in the shouldered seat in the wall of the housing.

In addition, where a noise reduction circuit is required there is a noise reduction circuit. The device of the instant invention does not necessarily require such a noise reduction circuit, but it is preferred herein.

The noise reduction circuit is connected to and between each of the wire leads at or near the points of connection of the wire leads to the piezoelectric diaphragm. There is also a modulator disc, the modulator disc overlays the piezoelectric diaphragm and has a diameter equal to or greater than the diameter of the piezoelectric diaphragm.

There is a receiving component. The receiving component is comprised of a housing having a front, a back, and a sidewall defining an interior void space. The sidewall is threaded on the interior surface, and the interior void space has a bottom, which bottom has a saucer-like concave configuration, and, centered in the saucer-like concave configuration is an elongated opening. The elongated opening passes from the saucer-like concave configuration, through the receiving housing, and exits to the exterior of the receiving component and is terminated by a tube connection.

There is a modulator disc, the modulator disc overlays the piezoelectric diaphragm and has a diameter equal to or greater than the diameter of the piezoelectric diaphragm.

There is a receiving component, the receiving component comprises a housing having a front, a back, and a sidewall defining an interior void space. The interior void space has a bottom, which bottom has a saucer-like concave configuration, and, centered in the saucer-like concave configuration is an elongated opening, which elongated opening passes from the saucer-like concave configuration, through the receiving housing, and exits to the exterior of the receiving component and is terminated and capped by a tube connection.

There is yet another embodiment of the sensor device, said device comprising a piezoelectric transducer assembly comprising in combination: a receiving assembly comprising a housing having a front and a back, wherein the back has centered therein, a hub, said centered hub having a first centered opening therethrough and a second centered opening therethrough, said centered hub being integrally connected to said retainer assembly, said receiving assembly having a first circular opening in the front, said first circular opening having a circular piezoelectric transducer element disposed therein; said piezoelectric transducer element having a bottom surface and a top surface, there being disposed on the top surface of the piezoelectric transducer element, at least one spacer disk, there being a second opening in the front, deeper than the first circular opening and having a lesser diameter than the diameter of the first circular opening; the centered opening in the centered hub continuing on through the transducer retainer assembly housing and opening into the second opening in the back to provide a continuous channel through the transducer retainer assembly that exits at the hub; an insertable assembly comprising a housing, said insertable housing having a front and a back, the front having a centered first opening therethrough, the front having a second centered opening therethrough, said second centered opening being of lesser diameter than the first centered opening in the front, said second centered opening continuing on through the insertable assembly and exiting out the back of the insertable assembly, said insertable assembly having a lesser diameter at the back than the insertable assembly has at the front; a saucer-like depression at the exit point of the second opening in the insertable assembly, said saucer-like depression having a top surface, the surface area of the top of the saucer-like depression being relative to the surface area of the top of the piezoelectric transducer element, said surface area relationship having a ratio in the range of from zero to 1:1, said saucer-like depression having an outside circumferential leading edge and disposed in said outside circumferential leading edge is a sealing means; a conductive cup, said conductive cup having a bottom and a top edge, said cup having a centered opening in the bottom thereof said cup being seated in the second opening of the receiving assembly such that the centered opening in the bottom of the cup aligns with the second centered opening in the back of the receiving retainer assembly, and B. an electrical connection, said electrical connection comprised of an electrical connector having a base, said base having a top and said base containing an electrical lead therein, which lead passes through the base and exits at the top of the base, said lead being surmounted by a spring, said spring being electrically connected to a resistor, said resistor being electrically grounded to the base, said connector inserted in and fastened into the second centered opening of the back of the receiving assembly such that the spring passes through the centered opening in the bottom of the conductive cup and impinges on the bottom surface of the piezoelectric transducer element.

DETAILED DESCRIPTION OF THE DRAWINGS

Figure 1:
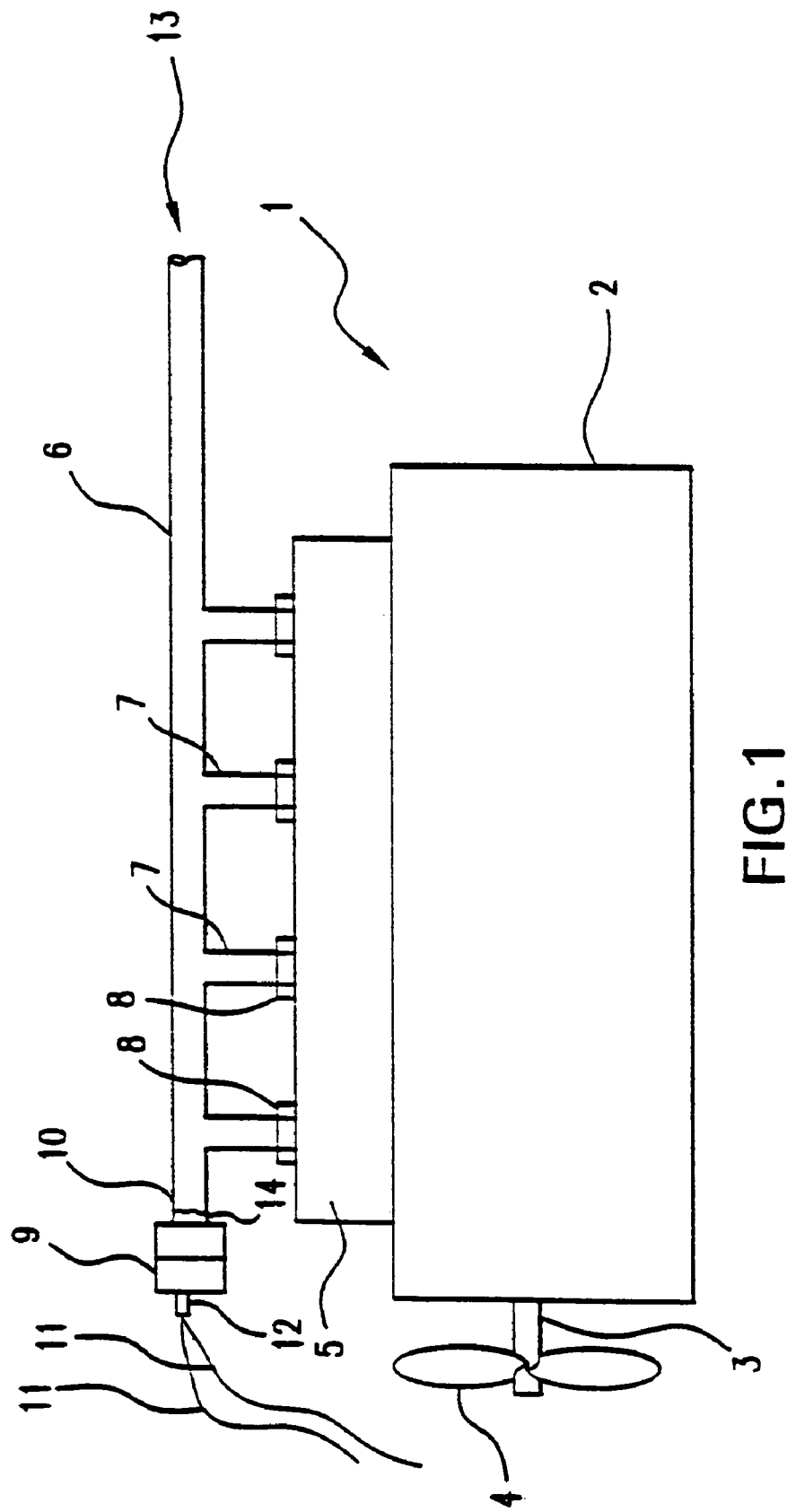
FIG. 1 is a schematic full side view of an internal combustion engine having a fuel rail mounted thereon showing the mounting of the sensor on the terminal end of the fuel rail.

Turning now to FIG. 1, which is a schematic full side view of an internal combustion engine 1, wherein there is shown an engine block 2, a shaft 3, a fan blade 4, an intake manifold 5, and mounted on the intake manifold 5, there is a fuel rail 6, through which fuel flows to the engine 2 and is injected through injector ports 7 and injectors 8.

Because of the hazards associated with prior art sensors in immediate contact with the fuel, it was not anticipated that the piezoelectric sensor 9 disclosed in this invention could not be so used. However, there is no necessity for electrical energy input into the device and no large output of electrical energy by the device, and since the electrical energy output is outside of the direct contact with the fuel, there is no hazard associated with the use of the device in this manner.

Thus, there is shown in FIG. 1 the piezoelectric sensor 9, mounted on the terminating end 10 of the fuel rail.

Wire leads 11 from the wire lead port 12 lead to a device for detecting the electrical charges generated by the piezoelectric sensor 9. Also shown is the high pressure inlet end of the fuel rail 6, and the connector for the piezoelectric sensor 9 to the terminating end 10 of the fuel rail 6.

Figure 2:
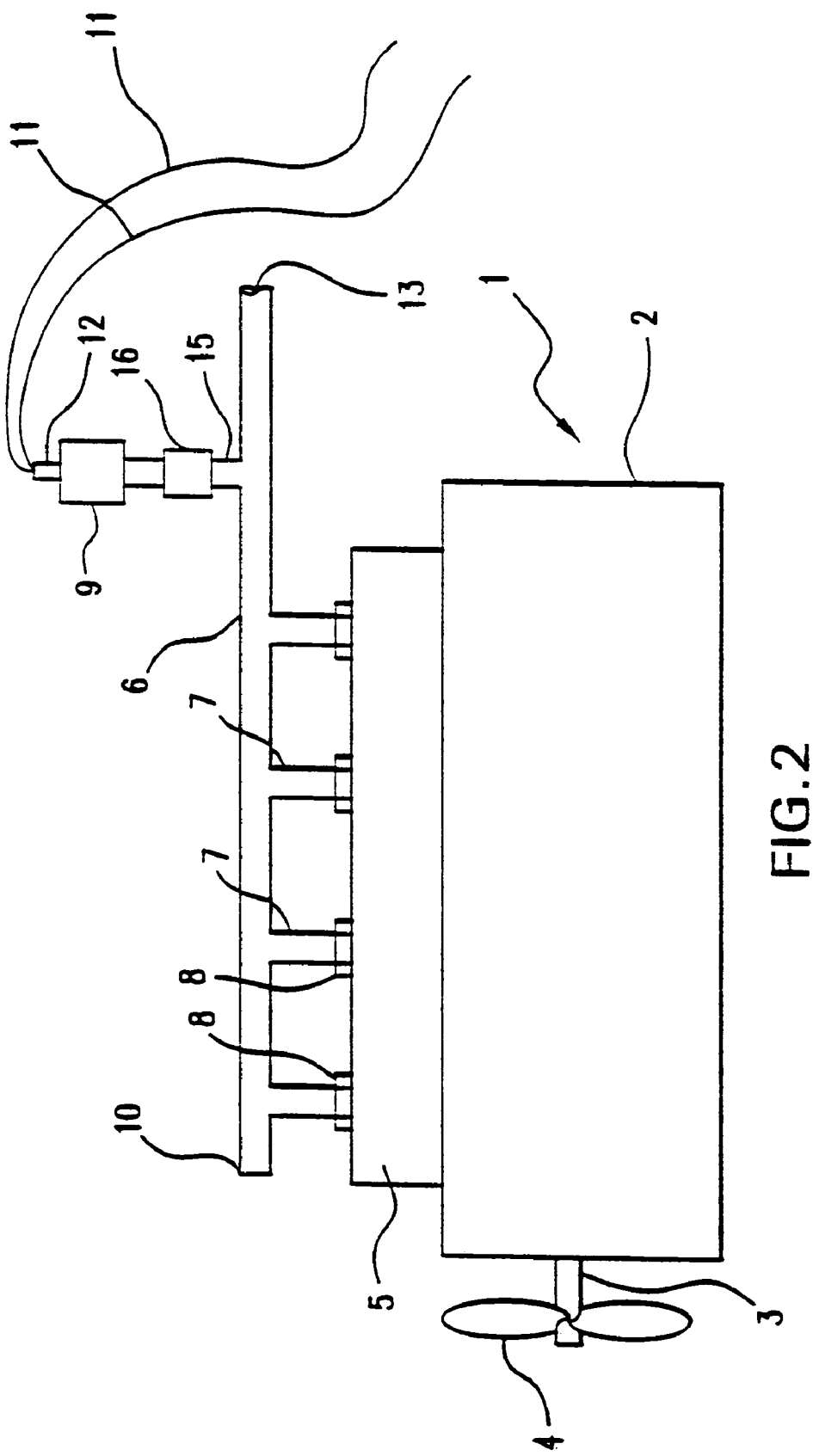
FIG. 2 is a schematic full side view of an internal combustion engine having a fuel rail mounted thereon showing the mounting of the sensor on the high pressure side of the fuel rail.

Turning now to FIG. 2, in which like numbers indicate like components, there is shown the engine 1, the engine block 2, the shaft 3, the fan blade 4, the intake manifold 5, the fuel rail 6, the injector ports 7, the injectors 8, the terminating end 10 of the fuel rail 6, and the wire leads 11.

In addition, it should be noted that the piezoelectric sensor 9 is mounted at the opposite end 14 of the fuel rail 6, that is the high pressure end 14, by a connecting means 15. The connecting means 15 has surmounted on it, a valve 16, such as a Schrader valve, such type of valve being well known to the automotive industry.

Surmounted on the valve 16 is a piezoelectric sensor 9. The purpose of the valve 16 is so that the fuel can be shut off from the piezoelectric sensor 9 when the sensor 9 is not needed for diagnostics, thus further ensuring the safety of the system.

Figure 3:
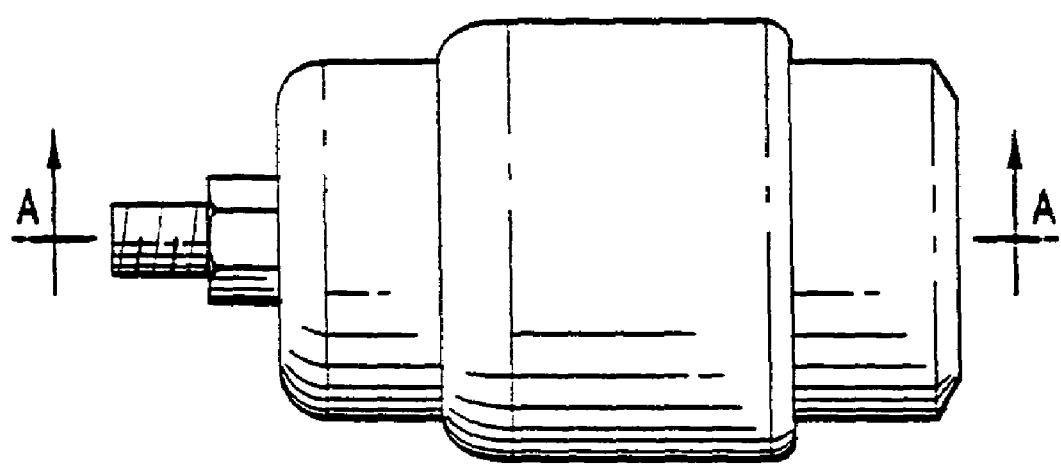
FIG. 3 is a side view of a sensor of this invention.
Figure 4:
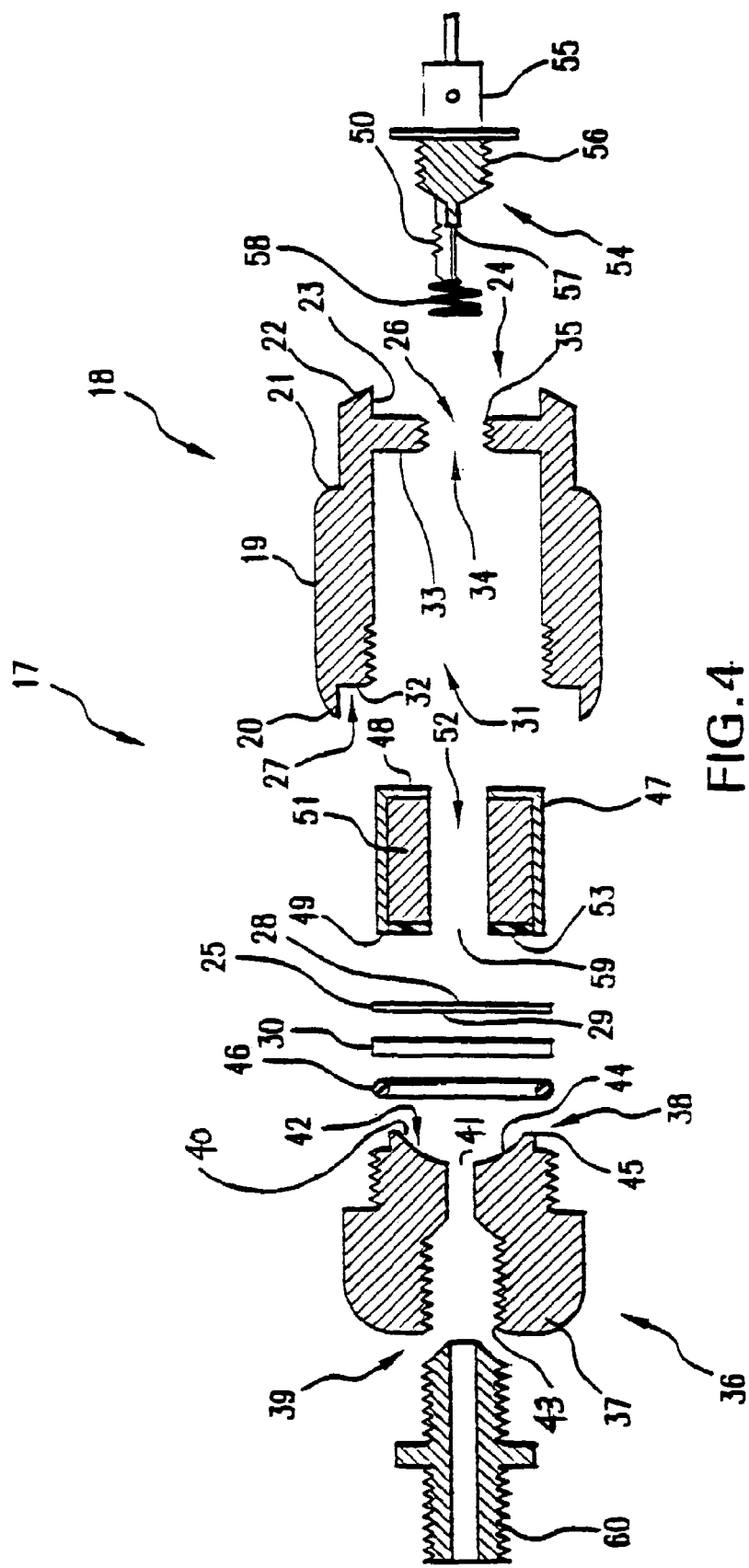
FIG. 4 is an exploded, cross sectional view of the sensor through line A—A of FIG. 3

Turning now to a further embodiment of this invention and with reference to FIG. 4, there is shown an exploded view of a sensor of FIG. 3 of this invention wherein the piezoelectric transducer assembly 17 is comprised of a receiving assembly 18 having a housing 19 wherein the housing 19 has a front 20 and a back 21. Centered in the housing at the back 21, is a centered hub 22. The centered hub 22 is integrally connected to the housing 19 and has a back and a front.

The centered hub 22 has a first centered opening 23 at the back 24 and a second centered opening 26 at the back 24, the second centered opening 26 being of a lesser diameter than the first centered opening 23.

The front 20 of the housing 19 has a first centered opening 27. The first centered opening 27 has a circular piezoelectric transducer element 25 disposed therein. The piezoelectric transducer element 25 has a bottom surface 28 and a top surface 29, there being disposed on the top surface 29 of the piezoelectric transducer element 25, at least one spacer disk 30. There is a second centered opening 31 in the front 20 of the housing 19, deeper than the first centered opening 27, that has a lesser diameter than the diameter of the first centered opening 27 such that there is a shelf or shoulder 32 created for the piezoelectric element 25 to rest on.

The second centered opening 31 is reduced in size near the bottom 33 to create a narrower opening 34 and the narrower opening 34 continues on through the housing 19 and opens into the a second centered opening 26 in the back 24 of the housing 19 to provide a continuous channel through the transducer retainer assembly 17 that exits at the hub at point 35.

There is an insertable assembly 36 comprising a housing 37. The housing 36 has a front 38 and a back 39, the front 38 has a first centered opening 40 through it, the front 38 having a second centered opening 41 through it, the second centered opening 41 being of lesser diameter than the first centered opening 40 at the front 38, the second centered opening 41 continuing on through the housing 37 and exiting out the back 39 at point 43 of the housing 37, said housing 37 having a lesser diameter at the back than the housing 37 at the front.

There is a saucer-like depression 42 located at the exit point 43 that opening into the housing 37. The saucer-like depression 42 has a top surface 44, the top surface 44 area of the top of the saucer-like depression 42 is relative to the surface area of the top 29 of the piezoelectric transducer element 25. The surface area relationship in this invention having a ratio in the range of from zero to 1:1. The saucer-like depression 42 has an outside circumferential leading edge 45 and disposed in said outside circumferential leading edge 45 is a sealing means 46.

There is a conductive cup 47, said conductive cup 47 having a bottom 48 and a top edge 49, said conductive cup 47 having a centered opening 50 in the bottom 48. The conductive cup 47 is seated in the second centered opening 31 such that the centered opening in the bottom 48 of the conductive cup 47 aligns with the second centered opening 26 in the back of the housing 19. The conductive cup 47 contains a plug 51 therein. The plug 51 has a centered opening 52 therein and the plug 51 is surmounted by a nonconductive washer 53.

The housing 19 has an electrical connection 54 in the back thereof. The electrical connection 54 has a base 55 having a top 56 and the base 55 contains an electrical lead 57 therein. The electrical lead 57 passes through the base 55 and exits at the top 43 of the base 55. The electrical lead 57 is surmounted by a spring 58. The electrical connection 54 is insertable in and fastened into the second centered opening 26 of the back 21 of the housing 19 such that the spring 58 passes through the centered opening 59 in the bottom 48 of the conductive cup 47 and impinges on the bottom surface 28 of the piezoelectric transducer element 25.

Optionally, the electrical connection 54 can be further modified with a resistor 50. The resistor 50 is located such that it is electrically connected to the spring 58 and electrically grounded to the base 55.

The insertable assembly 36 is provided with a means 60 in the front 38 of the insertable assembly 36 for attaching the sensor 9 to the fuel rail 6, such as a brass pipe fitting, such as that shown.

The system works by allowing the piezoelectric sensor to detect the pressure fluctuations associated with the operation of the fuel injection system. The advantage of the system is that it makes the internal combustion engine diagnostic more sensitive to changes in the internal combustion engine operation through the fuel flow, and can be used directly to sense these changes without having to take the time of doing other routine diagnostics to detect deviations in the flow of fuel. Any deviation in the pressure is sensed by the sensor and this information is conveyed by the piezoelectric device contained within the sensor to an analytical system via the wire leads 11.

What is claimed is:

1. A piezoelectric transducer assembly comprising in combination,

A. a receiving assembly comprising a housing having a front and a back, said back having centered therein, a hub, said centered hub having a first centered opening therethrough and a second centered opening therethrough, said centered hub being integrally connected to said housing, said housing having a first circular opening in the front, said first circular opening having a circular piezoelectric transducer element disposed therein; said piezoelectric transducer element having a bottom surface and a top surface, there being disposed on the top surface of the piezoelectric transducer element, at least one spacer disk, there being a second opening in the front, deeper than the first circular opening and having a lesser diameter than the diameter of the first circular opening; the centered opening in the centered hub continuing on through the transducer retainer assembly housing and opening into the second opening in the back to provide a continuous channel through the transducer retainer assembly that exits at the hub;

an insertable assembly comprising a housing, said housing having a front and a back, the front having a centered first opening therethrough, the front having a second centered opening therethrough, said second centered opening being of lesser diameter than the first centered opening in the front, said second centered opening continuing on through the housing and exiting out the back of the housing, said housing having a lesser diameter at the back than the insertable assembly has at the front;

a saucer-like depression at the exit point of the second opening in the housing, said saucer-like depression having a top surface, the surface area of the top of the saucer-like depression being relative to the surface area of the top of the piezoelectric transducer element, said surface area relationship having a ratio in the range of from zero to 1:1, said saucer-like depression having an outside circumferential leading edge and disposed in said outside circumferential leading edge is a sealing means;

a conductive cup, said conductive cup having a bottom and a top edge, said cup having a centered opening in the bottom thereof said cup being seated in the second opening of the housing such that the centered opening in the bottom of the cup aligns with the second centered opening in the back of the receiving retainer assembly housing, said conductive cup containing therein, a plug, said plug having a centered opening, said plug being surmounted by a washer, and B. an electrical connection, said electrical connection comprised of an electrical connector having a base, said base having a top and said base containing an electrical lead therein, which lead passes through the base and exits at the top of the base, said lead being surmounted by a spring, said connector inserted in and fastened into the second centered opening of the back of the housing such that the spring passes through the centered opening in the bottom of the conductive cup, the plug, and washer, and impinges on the bottom surface of the piezoelectric transducer element.

2. A piezoelectric transducer assembly as claimed in claim 1 wherein in B, there is a resistor that is electrically connected to the spring and electrically grounded to the base.

\* \* \* \* \*